(12) United States Patent
Kim et al.

(10) Patent No.: US 11,893,657 B2
(45) Date of Patent: Feb. 6, 2024

(54) SYSTEM AND METHOD FOR TRANSFERRING STYLE FOR RECOGNITION AREA

(71) Applicant: CoreDotToday Inc., Ulsan (KR)

(72) Inventors: Kyung Hoon Kim, Ulsan (KR); Bongsoo Jang, Ulsan (KR)

(73) Assignee: CoreDotToday Inc., Ulsan (KR)

( * ) Notice: Subject to any disclaimer, the term of this patent is extended or adjusted under 35 U.S.C. 154(b) by 197 days.

(21) Appl. No.: 17/529,158

(22) Filed: Nov. 17, 2021

(65) Prior Publication Data

US 2022/0076456 A1 Mar. 10, 2022

Related U.S. Application Data

(63) Continuation of application No. PCT/KR2020/004590, filed on Apr. 3, 2020.

(30) Foreign Application Priority Data

May 21, 2019 (KR) .................. 10-2019-0059322

(51) Int. Cl.
| | | |
|---|---|---|
| *G06T 11/00* | (2006.01) | |
| *G06N 20/00* | (2019.01) | |
| *G06V 10/22* | (2022.01) | |
| *G06T 3/00* | (2006.01) | |
| *G06T 5/50* | (2006.01) | |

(52) U.S. Cl.
CPC .............. *G06T 11/00* (2013.01); *G06N 20/00* (2019.01); *G06T 3/0056* (2013.01); *G06T 5/50* (2013.01); *G06V 10/225* (2022.01); *G06T 2207/20081* (2013.01); *G06T 2207/20221* (2013.01)

(58) Field of Classification Search
None
See application file for complete search history.

(56) References Cited

U.S. PATENT DOCUMENTS

| | | | | |
|---|---|---|---|---|
| 2013/0265502 | A1* | 10/2013 | Huebner ................. | G06T 15/20 |
| | | | | 348/789 |
| 2016/0048988 | A1* | 2/2016 | Lee ........................ | G06T 11/60 |
| | | | | 345/629 |

FOREIGN PATENT DOCUMENTS

| | | |
|---|---|---|
| KR | 10-2014-0086491 A | 7/2014 |
| KR | 10-2017-0097266 A | 8/2017 |
| KR | 10-2018-0012400 A | 2/2018 |
| KR | 10-2018-0114232 A | 10/2018 |

(Continued)

OTHER PUBLICATIONS

Gatys et al. (Image Style Transfer Using Convolutional Neural Networks, IEEE, 2016) (Year: 2016).*

(Continued)

*Primary Examiner* — Kyle Zhai
(74) *Attorney, Agent, or Firm* — Studebaker & Brackett PC

(57) ABSTRACT

A system, a method, and a computer program for transferring a system for a recognition area are provided. The range of an application object including a specific style is expanded from an image to a style of a real object or a style of a specific area included in a photo. In addition, the recognition area limited to a confined photo space is expanded to a real object and a background by using a projector beam. In addition, more various styles are mixed and applied to a painting style image, which is output, or an original image.

20 Claims, 9 Drawing Sheets

(56) References Cited

FOREIGN PATENT DOCUMENTS

KR           10-2057713  B1     12/2019

OTHER PUBLICATIONS

Li et al. (Universal Style Transfer via Feature Transforms, Neural Information Processing Systems, 2017) (Year: 2017).*
Ruder et al. (Artistic Style Transfer for Videos and Spherical Images, International Journal of Computer Vision, 2018) (Year: 2018).*
Melissa Perez, Gradient-Based Object-Selective Style Transfer for Videos, Graduate School, Dongseo University, Aug. 2017.
International Search Report issued in PCT/KR2020/004590; dated Jul. 7, 2020.
Jun-Yan Zhu et al., "Unpaired Image-to-Image Translation using Cycle-Consistent Adversarial Networks", arxiv.org, Mar. 30, 2017, Cornell University Library, Ithaca, New York, total 18 pages.
Liu Hanwen et al., "Artsy-GAN: A style transfer system with improved quality, diversity and performance", 2018 24th International Conference on Pattern Recognition (ICPR), IEEE, Aug. 20, 2018, pp. 79-84, doi: 10.1109/ICPR.2018.8546172.
Amelie Royer et al., "XGAN: Unsupervised Image-to-Image Translation for Many-to-Many Mappings", Jul. 10, 2018, https://arxiv.org/pdf/1711.05139v6.pdf, total 20 pages.
The extended European search report issued by the European Patent Office on Jun. 6, 2023, which corresponds to European Patent Application No. 20810608.8-1210 and is related to U.S. Appl. No. 17/529,158.

* cited by examiner

SYSTEM AND METHOD FOR TRANSFERRING STYLE FOR RECOGNITION AREA

CROSS-REFERENCE TO RELATED APPLICATIONS

The present application is a continuation of International Patent Application No. PCT/KR2020/004590, filed on Apr. 3, 2020, which is based upon and claims the benefit of priority to Korean Patent Application No. 10-2019-0059322 filed on May 21, 2019. The disclosures of the above-listed applications are hereby incorporated by reference herein in their entirety.

BACKGROUND

Embodiments of the inventive concept described herein relate to a system, a method, and a computer program for transferring a style for a recognition area.

Recently, a Stylus Transfer technology has been introduced to produce a new drawing having the painting style of a painter by synthesizing an image, which has styles of painters, with a general photo.

Such the Stylus Transfer technology reaches a general level that makes it easier for a person having some computer knowledge to use the Stylus Transfer, as the technology matures.

However, the Stylus Transfer technology according to the related art is to merely apply an image, which has a painting stylus of a painter, to a specific photo or a specific image to fail to satisfy various needs, such as reflecting a style of a real object or capturing a real recognition area to reflect a style to the real recognition area.

SUMMARY

Embodiments of the inventive concept provide a system and a method for transferring a style, capable of capturing a recognition area to be transformed by applying a style, and of applying, to the recognition area, a painting style image of a painter, or a specific style which is applied to an image or a real object.

However, the technical problems to be solved by the inventive concept are not limited to the aforementioned problems, and any other technical problems not mentioned herein will be clearly understood from the following description by those skilled in the art to which the inventive concept pertains.

According to an embodiment, a method for transferring a style for a recognition area, which is performed by a style transfer device according to the inventive concept includes setting a style of an application object to a guide line of Stylus Transfer trained based on a deep learning algorithm, capturing the recognition area, which is a transferring object, applying the set guide line to the recognition area, and outputting a recognition area having the guide line applied. The application object may include a painting style image output through a projector beam. The applying of the set guide line to the recognition area may include applying the set guide line to a background and an object included in the recognition area, and mixing and applying the guide line to the painting style image output through the projector beam.

In the applying of the set guide line to the recognition area, the guide line may be applied to an original painting style image together, when the original painting style image is included in the background in the recognition area.

In addition, according to the inventive concept, the method may further include setting an output area through the projector beam and the recognition area to have an equal size or different sizes. In this case, the applying of the set guide line to the recognition area may include mixing and applying the guide line to a whole painting style image output in the recognition area, when the output area and the recognition area are set to have an equal size, In addition, the applying of the set guide line to the recognition area may include mixing and applying the guide line to the painting style image output in the recognition area, which overlaps the output area, and only primarily applying the guide line to a portion, which does not overlap the output area, of the recognition area, when the output area and the recognition area are set to have mutually different sizes.

In addition, the application object may further include a plurality of specific objects included in a real object or an image including a specific style. In this case, when any one the plurality of specific objects included in the real object or the image is randomly selected, and when any specific style of the plurality of specific styles included in the selected specific object is randomly selected, the setting of the guide line to the Stylus Transfer may include setting the selected specific style of the selected specific object to the guide line.

According to an embodiment, a system for transferring a style for a recognition area, which is a transferring object may include a communication module to receive information on an application object and information on the recognition area, a memory to store a program for transferring the style for the recognition area, and a processor to execute the program stored in the memory. The processor may, as the program is executed, set a style of the application object to a guide line of Stylus Transfer trained based on a deep learning algorithm, apply the guide line to the recognition area received through the communication module and output a result, in which the application object includes a painting style image output through a projector beam, and apply the set guide line to a background and an object included in the recognition area, and mix and apply the guide line to a painting style image output through the projector beam.

In this case, the processor may apply the guide line to an original painting style image together, when applying the set guide line to the recognition area and the original painting style image is included in the background in the recognition area.

In addition, the output area through the projector beam and the recognition area may be set to have an equal size or different sizes. The processor may mix and apply the guide line to the whole painting style image output in the recognition area, when the set guide line is set to the recognition area and the output area and the recognition area are set to have an equal size, and may mix and apply the guide line to painting style image output in the recognition area, which overlaps the output area, and only primarily apply the guide line to a portion, which does not overlap the output area, of the recognition area, when the output area and the recognition area are set to have mutually different sizes.

In addition, the application object may further include a plurality of specific objects included in a real object or an image including a specific style. In this case, when a guide line for the Stylus Transfer is set, when any one of the plurality of specific objects included in the real object or the image is selected randomly, and when any one specific style of the plurality of specific styles included in the selected specific object is randomly selected, the processor may include set the selected specific style of the selected specific object to the guide line.

According to the inventive concept, when a computer program stored in a computer-readable recording medium is executed by at least one processor, the computer program may allow a plurality of processes to run to transfer a style for the recognition area. The plurality of processes may include a first process of setting a style of an application object to a guide line of Stylus Transfer trained based on a deep learning algorithm, a second process of capturing the recognition area, which is a transferring object, a third process of applying the set guide line to the recognition area, and a fourth process of outputting a recognition area having the guide line applied. The application object may include a painting style image output through a projector beam. The third process may be to apply the set guide line to a background and an object included in the recognition area, and may mix and apply the guide line to a painting style image output through the projector beam.

In this case, the third process may be to apply the guide line to an original painting style image together, when the original painting style image is included in the background in the recognition area.

In addition, the computer program according to the inventive concept may further include a fifth process of setting the output area through the projector beam and the recognition area to have an equal size or different sizes. In this case, the third process may mix and apply the guide line to the whole painting style image output in the recognition area, when the output area and the recognition area are set to have an equal size, and may mix and apply the guide line to painting style image output in the recognition area, which overlaps the output area, and only primarily apply the guide line to a portion, which does not overlap the output area, of the recognition area, when the output area and the recognition area are set to have mutually different sizes.

In addition, the application object may further include a plurality of specific objects included in a real object or an image including a specific style. In this case, when any one of the plurality of specific objects included in the real object or the image is selected randomly, and when any specific style of the plurality of specific styles included in the selected specific object is randomly selected, the first process may set the selected specific style of the selected specific object to the guide line.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Hereinafter, the embodiment of the inventive concept will be described in detail with reference to accompanying drawings to allow those skilled in the art to easily reproduce the inventive concept. However, the inventive concept may be implemented in various forms, and is limited to embodiments described herein. In addition, to clearly describe the inventive concept, part, which is irrelevant to the description, is omitted.

In the following description, when a certain part "includes" a certain component, the certain part does not exclude other components, but may further include other components if there is a specific opposite description.

Figure 1:
FIG. 1 is a view illustrating Style Transfer according to a related art.

FIG. 1 is a view illustrating Style Transfer according to a related art.

Style Transfer, which is called "image-to-image translation" or "texture transfer", is a manner to transfer one image "P" to a new image "X" having the style of another image "A".

For example, as illustrated in FIG. 1, a general photo image "P" is applied with the style of 'Starry Night' of 'Van Gogh' such that a new image is produced.

According to an embodiment of the inventive concept, Stylus Transfer is more advanced to directly apply a style to an object, such as a real person, and a background, through a project beam, instead of a photo, or to directly apply a specific style of a real object or an image.

Hereinafter, a system (style transfer system) 100 for transferring a style will be described with reference to FIG. 2, according to an embodiment of the inventive concept.

Figure 2:
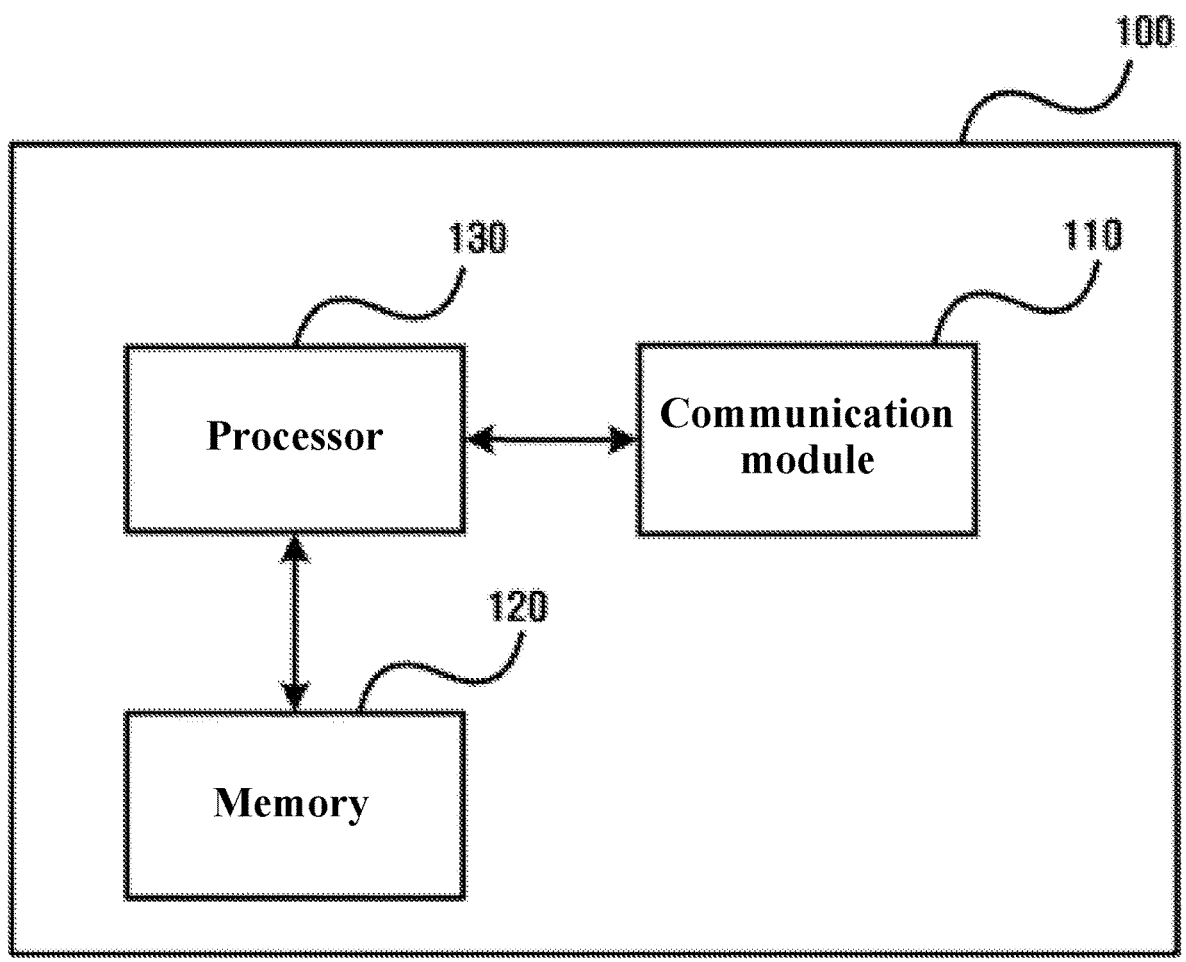
FIG. 2 is a block diagram of a style transfer system, according to an embodiment of the inventive concept.

FIG. 2 is a block diagram of the style transfer system 100, according to an embodiment of the inventive concept.

According to an embodiment of the inventive concept, the style transfer system 100 may include a communication module 110, a memory 120, and a processor 130.

The communication module 110 receives information on a recognition area which is a transferring object to be transformed, and information on an application object.

The communication module 110 may include a wired communication module and a wireless communication module. The wired communication module may be implemented with a power line communication device, a telephone line communication device, a cable home (MoCA), Ethernet, IEEE1294, an integrated wired home network, and an RS-485 control device. In addition, the wireless communication module may be implemented with a wireless LAN (WLAN), Bluetooth, a high-data-rate wireless personal area network (HDR WPAN), ultra-wideband (UWB), ZigBee, Impulse Radio, 60 GHz-wireless personal area network (WPAN), Binary-CDMA, wireless USB technology, or wireless HDMI technology.

According to the inventive concept, an application object refers to an object including a specific style, such as a painting style of a painter. According to an embodiment, the application object may be an image, which is output through a project beam and has a painting style of a painter, or a specific object included in a real object or an image including a specific style.

According to the inventive concept, the recognition area refers to an area to be applied with the specific style. According to an embodiment, the recognition area may a specific area captured by a camera or a specific image scanned by a scanner.

The memory 120 stores a program for transferring the style for the recognition area, and the processor 130 executes the program stored in the memory 120. In this case, the memory 120 is collectively referred to as a non-volatile storage device to continuously retain stored information even if power is not applied, and a volatile storage device.

For example, the memory 120 may include a NAND flash memory, such as a compact flash (CF) card, a secure digital (SD) card, a memory stick, a solid-state drive (SSD), and a micro SD card, a magnetic computer storage device, such as a hard disk drive (HDD), and an optical disc drive such as a CD-ROM and a DVD-ROM.

The processor 130 sets the style of the application object to a guide line of Stylus Transfer trained based on a deep learning algorithm, by executing the program stored in the memory 120.

In addition, the guide line is applied to the recognition area received through the communication module 110, and an applied result is output.

Hereinafter, a method performed by the style transfer system 100 according to an embodiment of the inventive concept will be described with reference to FIGS. 3 to 5D in detail.

Figure 3:
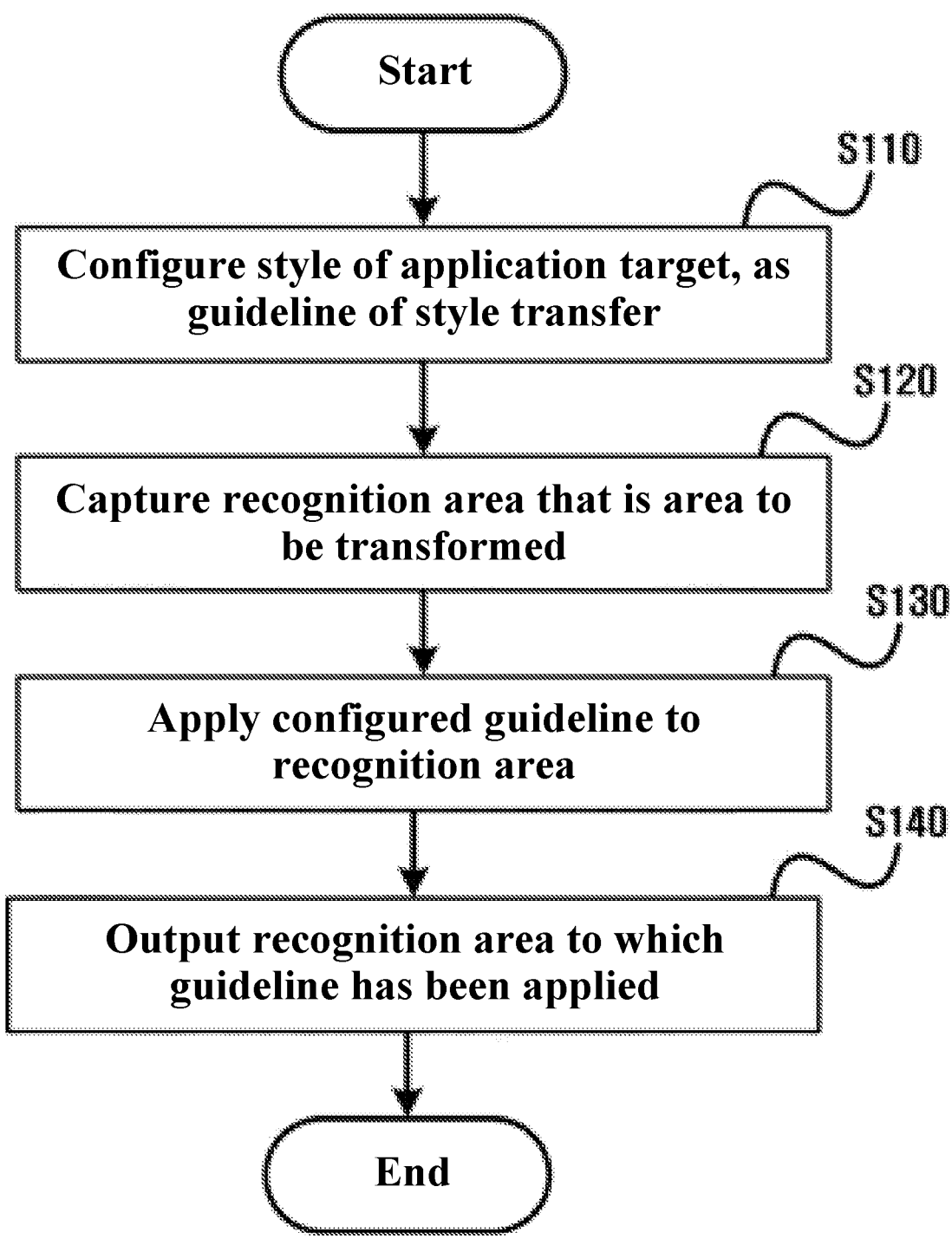
FIG. 3 is a flowchart of a style transfer method, according to an embodiment of the inventive concept.

FIG. 3 is a flowchart of a style transfer method, according to an embodiment of the inventive concept.

According to an embodiment of the inventive concept, the style transfer method includes setting a style of the application object to a guide line of Stylus Transfer trained based on a deep learning algorithm (S110).

According to the inventive concept, the application object may be a painting style image output through a project beam.

In other words, according to an embodiment of the inventive concept, the painting style image, which is the application object of the Stylus Transfer, may be output through the projector beam, and the output painting style image may be set to the guide line of the Stylus Transfer.

In addition, according to an embodiment of the inventive concept, the application object may be a specific object which is included in a real object or an image having a specific style.

In other words, a specific style, which is applied to a specific object included in a real object, or a video or an image, may be extracted and may be set to the guide line of the style transfer.

Then, the recognition area, which is the transferring object, is captured (S120).

According to an embodiment, the recognition area may be a specific area captured by the camera or a specific image scanned through a scanner. Hereinafter, the recognition area may be assumed as the specific area captured by the camera, for the convenience of explanation.

Next, the set guide line is applied to the captured recognition area (S130), and the recognition area having the guide line applied is output (S140).

The following description will be made regarding an embodiment of setting a specific style included in a real object or an image to a guide line and of applying the guide line to a recognition area, after configuring an embodiment of setting a painting style image to a guide line using a projector beam and of applying the guide line to a recognition area.

Figure 4A:
FIG. 4A is a view illustrating a recognition area which is captured.
Figure 4B:
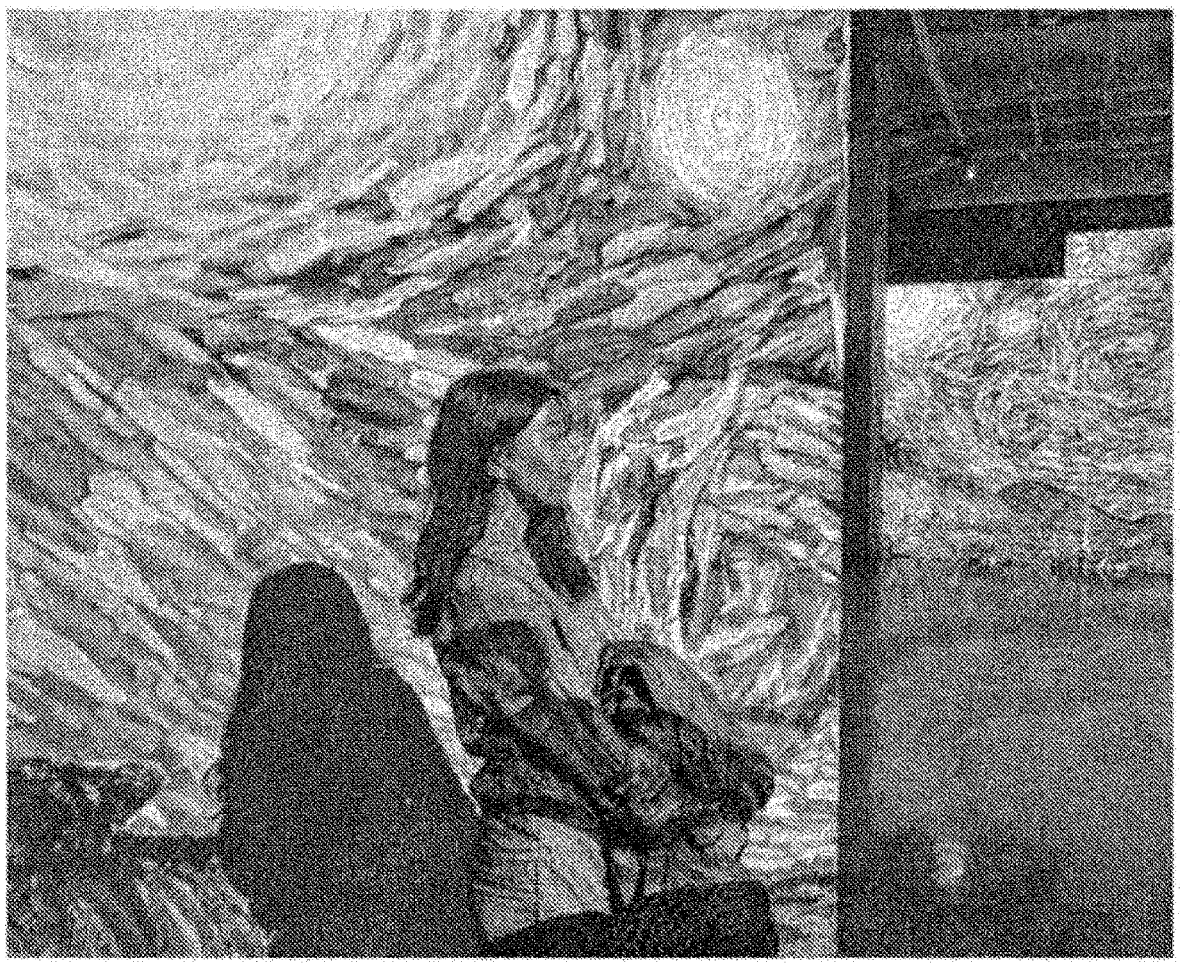
FIG. 4B is a view illustrating a recognition area applied with a guide line and output.

FIG. 4A is a view illustrating a recognition area which is captured, and FIG. 4B is a view illustrating a recognition area applied with a guide line and output.

FIG. 4A is a view illustrating that a painting stylus image of "Starry night" of "Gogh" is output through a projector beam.

Regarding the detailed description made with reference to FIG. 4A, an original painting stylus image is disposed at a right area, a style image is output to a left area, through the projector beam, and a person, which is an object, is positioned at a portion of the left area. The whole area of FIG. 4A represents a recognition area recognized by the camera.

According to an embodiment of the inventive concept, the painting style of "Gogh" applied to the painting style image of "Starry Night" output through the projector beam is set to a guide line of the Stylus Transfer trained based on the deep learning algorithm.

In addition, after capturing the recognition area through the camera as illustrated in FIG. 4A, the guide line set based on the painting style of the "Starry Night" is applied to the recognition area.

In addition, according to an embodiment of the inventive concept, the set guide line is applied to a background or an object included in the recognition area and, mixed and applied to the painting stylus image output through the projector beam.

In other words, as illustrated in FIG. 4A, the guide line set based on the painting style of the "Starry Night" may be applied to the painting style image, which is output through the projector beam, an object, and a remaining background area other than the painting style image and the object output through the projector beam.

In this process, as the guide line set based on the paining style of the "Starry Night" is once more applied to the painting style image output through the projector beam, a result having the painting style of 'Gogh', which is mixed and applied, is output with respect to the painting style image which is included in the recognition area, as illustrated in FIG. 4B.

In addition, according to an embodiment of the inventive concept, when an original painting style image is included in the background in the recognition area, the guide line may be applied to the original painting style image together.

In other words, separately from the painting style image output through the projector beam as illustrated in FIG. 4A, when the original painting style image is included in the recognition area, the guide line set based on the painting style of the "Starry Night" is once more applied to the original painting style image. Accordingly, a result having the painting style of "Gogh" mixed and applied may be output with respect to the painting style image in the recognition area as illustrated in FIG. 4B.

As a result, as illustrated in FIG. 4B, the painting style image set to the guide line is additionally applied to the original painting style image and the painting style image output through the projector beam in the recognition area. Accordingly, the original painting style image and the painting style image output through the projector beam, in the recognition area may be transformed to have a more impressed style. In addition, the object or the background area may be applied with the painting style image one time.

According to an embodiment, an area and an extent, in which the guide line is applied, may be adjusted by a user.

For example, the user may apply the guide line only for a human object area illustrated in FIG. 4A. In addition, the user may set the extent depending on a plurality of levels which are preset.

Meanwhile, according to an embodiment of the inventive concept, the area output through the projector beam and the recognition area captured by the camera may be set to be in equal size or in different sizes.

According to an embodiment, when the area output through the projector beam is set to have an equal size as that of the recognition area, the guide line may be mixed and applied to the whole painting style image output in the recognition area.

In other words, when the area output through the projector beam is set to have an equal size as that of the recognition area, the recognition area by the camera is set to have the size equal to the size of a painting style image to be output through the projector beam. Accordingly, the whole painting style image is matched to the whole recognition area.

Accordingly, when the guide line is applied to the recognition area, the guide line is mixed and applied to the painting style image having a style applied thereto. Accordingly, the result has a more impressed style, as in the output area through the projector beam of FIG. 4B.

According to another embodiment, when the output area through the projector beam and the recognition area are set to have mutually different sizes, the guide line is mixed and applied to a painting style image which is output in the recognition area overlapped the area output through the projector beam. Accordingly, the painting style image may be transformed to have a more impressed style like the output area through the projector beam of FIG. 4B.

In addition, the guide line is only primarily applied to the recognition area which does not overlap the output area through the projector beam one time. Accordingly, the recognition area may be transformed to have a less impressed style, as compared to that a part having the guide line mixed and applied.

According to an embodiment of employing such a projector beam, an image having a painting stylus of a painter is set to a guide line by using a projector beam, and the guide line is applied to Stylus Transfer. Accordingly, the guide line is suggested to a deep learning algorithm to provide a manner of applying the painting style of the painter to a photo.

Figure 5A:
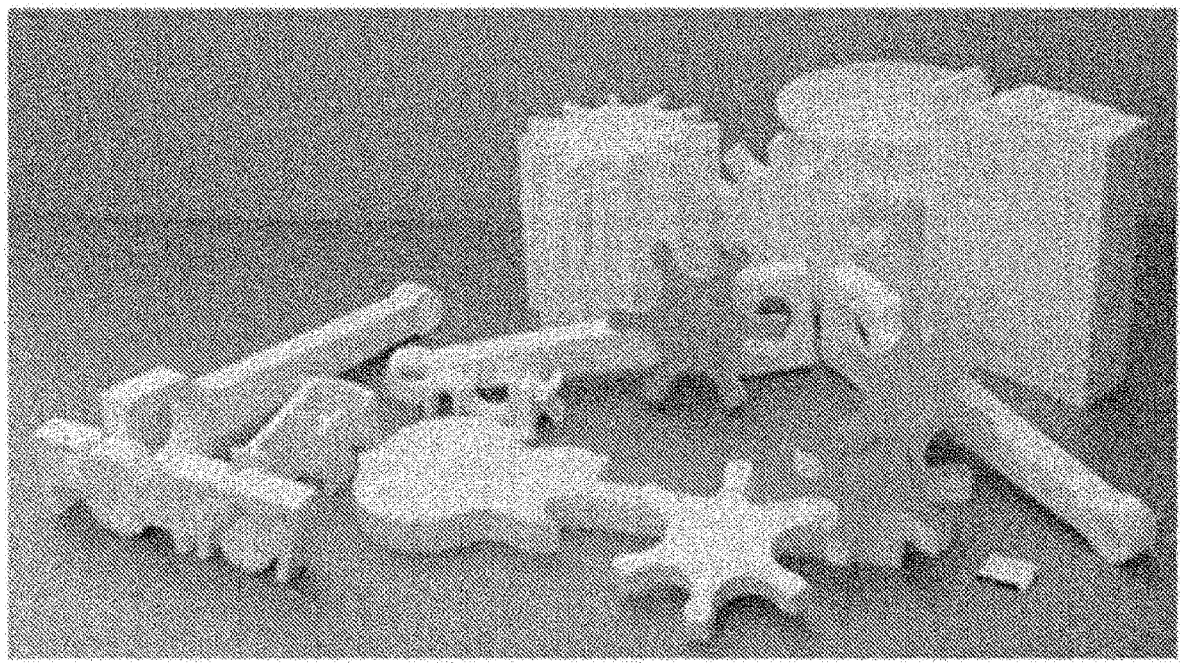
FIGS. 5A to 5D are views illustrating an embodiment in which a specific style included in a real object or an image is set to a guide line and the guide line is applied to a recognition area.
Figure 5B:
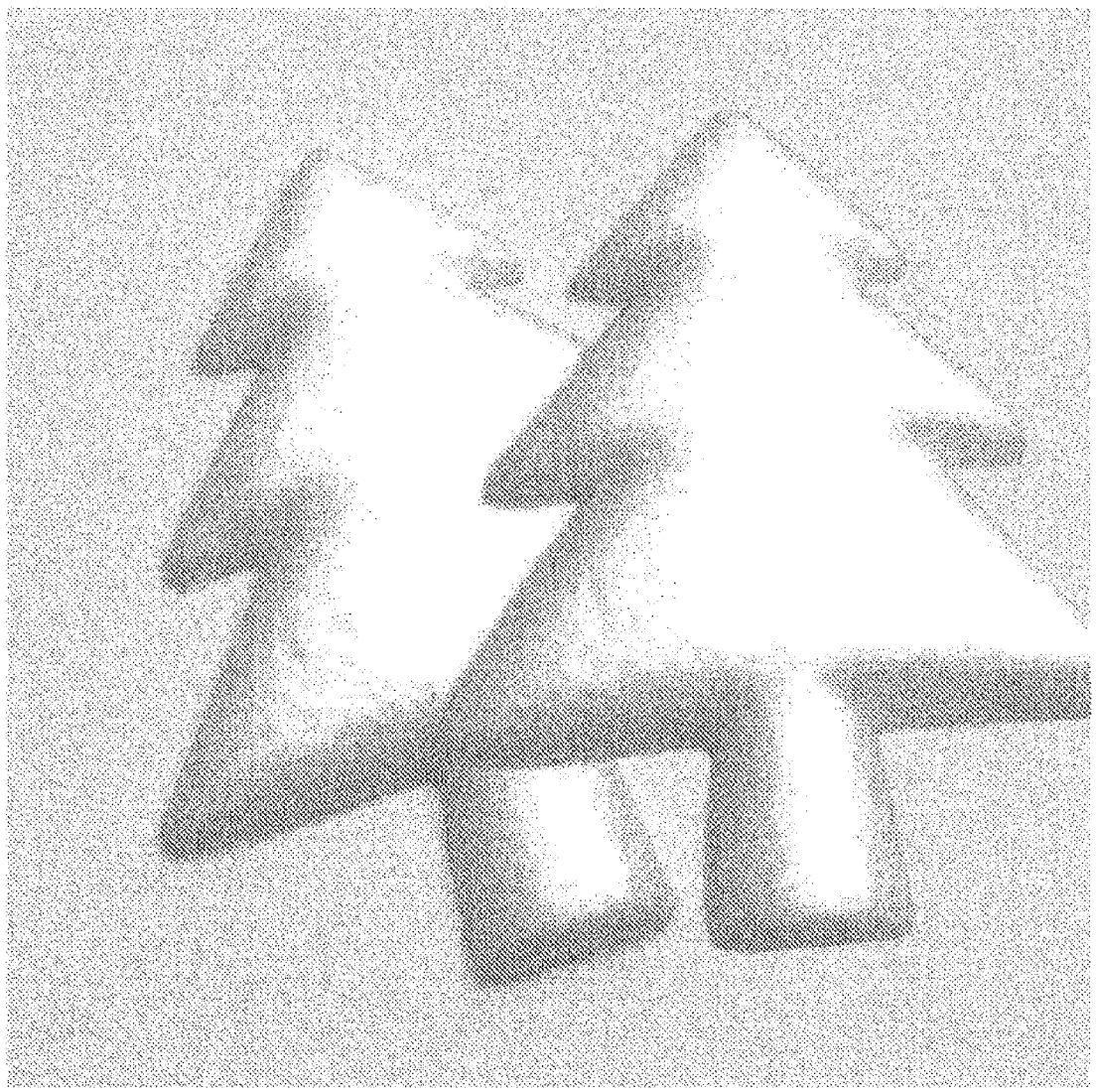

FIGS. 5A to 5B are views illustrating an embodiment in which a specific style included in a real object or an image is set to a guide line and the guide line is applied to a recognition area.

According to another embodiment of the inventive concept, the application object may be a specific object included in a real object or an image including a specific style.

Therefore, according to the inventive concept, the specific style included in the real object or the specific object included in the image is set to the guide line, and the guide line may be applied to Style Transfer.

For example, as illustrated in FIG. 5A, a part to be applied with a painting stylus of a painter is expressed as an article formed of Styrofoam. The part is captured by a camera and set to the guide line, such that the guide line is applied to the Stylus Transfer.

In addition, as illustrated in FIG. 5B, a processed object formed of Styrofoam may suggest a guide line to Stylus Transfer, which is a deep learning algorithm to provide a manner of applying a painting style of a painter to a photo.

Figure 5C:
Figure 5D:

After the guide line is set, a recognition area, which is expressed as a paper cut object having the shape of a lush tree or as a processed object formed of Styrofoam and is the transferring object, is captured by a camera as illustrated in FIG. 5C. As the set guide line is applied to the recognition area, processed objects may be transformed through Stylus Transfer while being distinguished from each other as in illustrated FIG. 5D. In this case, as illustrated in FIG. 5D, the leaf shapes are deformed based on the painting style of the painter.

Meanwhile, according to an embodiment of the inventive concept, a specific style of a plurality of specific objects included in a real object or an image may be selectively applied.

First, any one of a plurality of specific objects included in the real object or the image may be selected randomly or an input of a user.

In addition, any one of a plurality of specific styles included in the selected specific object may be selected randomly or by the input of the user. Accordingly, the selected specific style of the selected specific object may be set to the guide line and may be applied to Stylus Transfer.

In the above-description, step S110 to step S140 may be more sub-divided or may be combined into a smaller number of steps. In addition, some steps may be omitted if necessary, and the sequence between the steps may be changed. In addition, the above-description of the style transfer system 100 in FIG. 2 is applied to the style transfer method illustrated in FIG. 3 to FIG. 5D, even if the above-description is partially omitted in the following description of the style transfer method.

An embodiment of the inventive concept may be implemented in the form of a computer program stored in a medium executed by a computer or the form of a recording medium including an instruction executable by the computer. The computer-readable medium may be any available media that is able to be accessed by a computer and includes all volatile and nonvolatile media, removable and non-removable media. In addition, a computer-readable medium may include a computer storage medium and a communication medium. The computer storage medium includes volatile and nonvolatile media, removable and non-removable media implemented through any method or technology for storing information such as a computer readable instruction, a data structure, a program module, or other data. A communication medium typically contains a computer readable instruction, a data structure, a program module, or other data in a modulated data signal such as a carrier wave, or other transport mechanisms, and includes any information transmitting medium.

In other words, when the computer program stored in the computer-readable recording medium of the inventive concept is executed by at least one processor, the computer program may allow a plurality of processes to run to transfer a style for the recognition area.

In detail, the plurality of processes may include a first process of setting a style of an application object to a guide line of Stylus Transfer trained based on a deep learning algorithm, a second process of capturing the recognition area, which is a transferring object, a third process of applying the set guide line to the recognition area, and a fourth process of outputting a recognition area having the guide line applied. The application object may include a painting style image output through a projector beam. The third process may apply the set guide line to a background and an object included in the recognition area, and may mix and apply the guide line to a painting style image output through the projector beam.

In addition, according to an embodiment of the inventive concept, when an original painting style image is included in the background in the recognition area, the guide line may be applied to the original painting style image together.

In addition, the computer program according to the inventive concept may further include a fifth process of setting the output area through the projector beam and the recognition area to have an equal size or different sizes. In this case, the third process may mix and apply the guide line to the whole painting style image output in the recognition area, when the output area and the recognition area are set to have an equal size, and may mix and apply the guide line to painting style image output in the recognition area, which overlaps the output area, and only primarily apply the guide line to a portion, which does not overlap the output area, of the recognition area, when the output area and the recognition area are set to have mutually different sizes.

In addition, the application object may further include a plurality of specific objects included in a real object or an image including a specific style. In this case, when any one of the plurality of specific objects included in the real object or the image is selected randomly, and when any specific style of the plurality of specific styles included in the selected specific object is randomly selected, the first process may set the selected specific style of the specific object to the guide line.

Although a method and a system of the inventive concept have been described in association with a specific embodiment, some or an entire portion of components or operations of the method and the system may be implemented using a computer system having a general-purpose hardware architecture.

According to an embodiment of the inventive concept, the range of an application object including a specific style may be expanded from an image to a style of a real object or a style of a specific area included in a photo.

In addition, a recognition area limited to a confined photo space may be expanded to a real object and a background by using a projector beam. In addition, more various styles may be mixed and applied to a painting style image, which is output, or an original image.

The effects of the inventive concept are not limited to the above, but other effects, which are not mentioned, will be apparently understood to those skilled in the art.

The above description has been made only for the illustrative purpose, and those skilled in the art should understand that various modifications are possible without departing from the technical scope of the inventive concept or without changing the subject matter of the inventive concept. Therefore those skilled in the art should understand that the technical embodiments are provided for the illustrative purpose in all aspects and the inventive concept is not limited thereto. For example, components described in a singular form may be reproduced while being distributed. Similarly, components described in a distribution form may be reproduced in a combination form.

The scope of the inventive concept falls into the scope of the appended claims instead of the detailed description, those skilled in the art should interpret that all variations or modifications derived from the meaning and the range of claims, and equivalents of the claims are included in the scope of the inventive concept.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method for transferring a style for a recognition area, which is performed by a style transfer device, the method comprising:
    projecting a painting style image on an output area through a projector beam;
    setting a style of the projected painting style image as a guideline of Stylus Transfer trained based on a deep learning algorithm;
    capturing, by a camera, an image of the output area encompassing the projected painting style image and at least one object positioned between the camera and the output area;
    setting the recognition area from the captured image;
    applying the set guideline to the at least one object and its background, in the recognition area; and
    projecting, on the output area, through the projector beam, an application image which includes the recognition area including the at least one object and its background, which have been the guideline applied,
    wherein the projected application image is overlapped on the projected painting style image.

2. The method of claim 1, wherein the applying of the set guideline comprises:
    applying the guideline to an original painting style image together, when the original painting style image is included in the background in the recognition area.

3. The method of claim 1, further comprising:
    setting the recognition area to be smaller than the output area.

4. The method of claim 1,
    setting the recognition area and the output area to have an equal size,
    wherein both the painting style image and the application image are mixed and projected on the whole output area.

5. The method of claim 3,
    wherein both the painting style image and the application image are mixed and projected on a first portion of the output area,
    wherein only the painting style image is projected on a second portion of the output area, and
    wherein the first portion is in which the output area and the recognition area are overlapped, and the second portion is in which the output area and the recognition area are not overlapped.

6. The method of claim 1, wherein the painting style image includes:
    a real image or an artificial image, which includes a plurality of specific objects, each of which has a specific style.

7. The method of claim 6, wherein the setting the style comprises:
    setting the guideline based on selections of one object of the plurality of specific objects and one style of styles of the plurality of specific objects, and
    wherein the selections are randomly made or are made by user inputs.

8. A system comprising:
    a projector beam;
    a camera; and
    a processor;
    wherein the processor is configured to perform:
    projecting a painting style image on an output area through the projector beam;
    setting a style of the projected painting style image as a guideline of Stylus Transfer trained based on a deep learning algorithm;
    capturing, by the camera, an image of the output area encompassing the projected painting style image and at least one object positioned between the camera and the output area;
    setting a recognition area from the captured image;
    applying the set guideline to the at least one object and its background, in the recognition area; and projecting, on the output area, through the projector beam, an application image which includes the recognition area including the at least one object and its background, which have been the guideline applied,
wherein the projected application image is overlapped on the projected painting style image.

9. The system of claim 8, wherein the processor is further configured to perform:
apply the guideline to an original painting style image together when the original painting style image is included in the background in the recognition area.

10. The system of claim 8, wherein the recognition area is smaller than the output area.

11. The system of claim 10,
wherein both the painting style image and the application image are mixed and projected on a first portion of the output area,
wherein only the painting style image is projected on a second portion of the output area, and
wherein the first portion is in which the output area and the recognition area are overlapped, and the second portion is in which the output area and the recognition area are not overlapped.

12. The system of claim 8, wherein the recognition area and the output area have an equal size, and
wherein both the painting style image and the application image are mixed and projected on the whole output area.

13. The system of claim 8, wherein the painting style image includes:
a real image or an artificial image, which includes a plurality of specific objects, each of which has a specific style.

14. The system of claim 13, wherein the processor is further configured to perform:
setting the guideline based on selections of one object of the plurality of specific objects and one style of styles of the plurality of specific objects, and
wherein the selections are randomly made or are made by user inputs.

15. A non-transitory computer readable medium storing a computer program, and coupled with a computer hardware, wherein the computer program includes instructions to perform:
projecting a painting style image on an output area through a projector beam;
setting a style of the projected painting style image as a guideline of Stylus Transfer trained based on a deep learning algorithm;
capturing, by a camera, an image of the output area encompassing the projected painting style image and at least one object positioned between the camera and the output area;
setting a recognition area from the captured image;
applying the set guideline to the at least one object and its background, in the recognition area; and
projecting, on the output area, through the projector beam, an application image which includes the recognition area including the at least one object and its background, which have been the guideline applied,
wherein the projected application image is overlapped on the projected painting style image.

16. The non-transitory computer readable medium of claim 15, wherein the applying of the set guideline comprises:
applying the guideline to an original painting style image together, when the original painting style image is included in the background in the recognition area.

17. The non-transitory computer readable medium of claim 15,
wherein the recognition area is smaller than the output area,
wherein both the painting style image and the application image are mixed and projected on a first portion of the output area,
wherein only the painting style image is projected on a second portion of the output area, and
wherein the first portion is in which the output area and the recognition area are overlapped, and the second portion is in which the output area and the recognition area are not overlapped.

18. The non-transitory computer readable medium of claim 15,
wherein the recognition area and the output area have an equal size, and
wherein both the painting style image and the application image are mixed and projected on the whole output area.

19. The non-transitory computer readable medium of claim 15, wherein the painting style image includes:
a real image or an artificial image, which includes a plurality of specific objects, each of which has a specific style.

20. The non-transitory computer readable medium of claim 19, wherein the setting the style comprises:
setting the guideline based on selections of one object of the plurality of specific objects and one style of styles of the plurality of specific objects, and
wherein the selections are randomly made or are made by user inputs.

* * * * *